US012259114B1

(12) United States Patent
Wang et al.

(10) Patent No.: US 12,259,114 B1
(45) Date of Patent: Mar. 25, 2025

(54) FLOOR LAMP WITH LIGHT-EMITTING LAMP POLE

(71) Applicant: Peng Gong, Shenzhen (CN)

(72) Inventors: Haipeng Wang, Shenzhen (CN); Mingfeng Yang, Shenzhen (CN)

(73) Assignee: Peng Gong, Shenzhen (CN)

( * ) Notice: Subject to any disclaimer, the term of this patent is extended or adjusted under 35 U.S.C. 154(b) by 0 days.

(21) Appl. No.: 18/820,363

(22) Filed: Aug. 30, 2024

(51) Int. Cl.
*F21V 21/06* (2006.01)
*F21S 4/28* (2016.01)
*F21S 6/00* (2006.01)
*F21V 23/06* (2006.01)

(52) U.S. Cl.
CPC ................ *F21V 21/06* (2013.01); *F21S 4/28* (2016.01); *F21S 6/005* (2013.01); *F21V 23/06* (2013.01)

(58) Field of Classification Search
CPC ........ F21S 6/004; F21S 6/24–28; F21S 6/005; F21V 23/004; F21V 23/06; F21V 21/06
See application file for complete search history.

(56) References Cited

U.S. PATENT DOCUMENTS 10,113,718 B2 * 10/2018 Gorman .................... F21K 9/27
2017/0314748 A1 * 11/2017 Katterheinrich ........ F21S 6/002
2022/0221131 A1 7/2022 Shapiro
2022/0357026 A1 11/2022 Zhang

FOREIGN PATENT DOCUMENTS

CA 2959673 A1 * 8/2018 .............. F21S 6/002
CN 209484337 U 2/2020

OTHER PUBLICATIONS

Innovation Q+ NPL Search (Year: 2024).*

* cited by examiner

*Primary Examiner* — Anabel Ton
(74) *Attorney, Agent, or Firm* — Ricky Lam

(57) ABSTRACT

Disclosed is a floor lamp with a light-emitting lamp pole, including: a top light source assembly; a lamp pole, where one end of the lamp pole is connected to the top light source assembly, the other end of the lamp pole is connected to a base, and a groove is formed on a surface of the lamp pole; a lamp strip detachably mounted in the groove of the lamp pole; a controller, where the controller is electrically connected to a power line and electrical interfaces for power supply and control of the floor lamp; and an electrical interface is arranged at both ends of the groove respectively, the two electrical interfaces are electrically connected to the controller and the top light source assembly respectively, and a power supply circuit and a control circuit of the top light source assembly and the lamp strip are communicated with the controller.

9 Claims, 8 Drawing Sheets

FLOOR LAMP WITH LIGHT-EMITTING LAMP POLE

TECHNICAL FIELD

The present disclosure belongs to the technical field of floor lamps, and relates to a floor lamp with a light-emitting lamp pole.

BACKGROUND

A floor lamp is a common household lighting fixture, and usually includes a base, a pole or column, and a top fixture. The floor lamp is capable of achieving local lighting, and can be placed beside a sofa or a bed, or in a reading area, which adds a warm atmosphere to a room.

The floor lamp in the prior art has relatively single light-emitting effects, and is provided with only a decorative lamp strip or only a light source for lighting.

SUMMARY

Aiming at the defects of the prior art, an objective of the present disclosure is to provide a floor lamp with a light-emitting lamp pole. The floor lamp is capable of meeting both lighting and decorative needs, and a top light source assembly and a lamp strip can be controlled separately.

In order to achieve the above objective, the present disclosure adopts a technical solution as follows:

a floor lamp with a light-emitting lamp pole, including:

a top light source assembly;

- a lamp pole, where one end of the lamp pole is connected to the top light source assembly, the other end of the lamp pole is connected to a base, and a groove is formed on a surface of the lamp pole;

a lamp strip, where the lamp strip is detachably mounted in the groove of the lamp pole;

a controller, where the controller is electrically connected to a power line and electrical interfaces for power supply and control of the floor lamp; and an electrical interface is arranged at both ends of the groove respectively, the two electrical interfaces are electrically connected to the controller and the top light source assembly respectively, and when the lamp strip is mounted in the groove and connected to the electrical interfaces, a power supply circuit and a control circuit of the top light source assembly and the lamp strip are communicated with the controller.

Further, the lamp strip is provided with a first cavity and a second cavity;

- a light source of the lamp strip is arranged in the first cavity, and a connector of the electrical conductor configured for communicating with both ends of the lamp strip is arranged in the second cavity; and
- the first cavity is located above the second cavity, and when the lamp strip is mounted in the groove, the first cavity faces outside of the groove.

Further, sealing strips are arranged on both sides of the lamp strip in an extending direction of the lamp strip, and sealing grooves corresponding to the sealing strips are formed on a side wall of the groove.

Further, the electrical interfaces include 5 line contact points, and the 5 line contact points are respectively used for independent power supply and control of the top light source and the lamp strip.

Further, the electrical interfaces are pin slots, and the interfaces at both ends of the lamp strip are pins.

Further, a power supply base of a light source of the top light source assembly is provided with 3 line contact points corresponding to a power supply loop and a control circuit of the light source.

A lamp holder of the top light source assembly is provided with metal parts corresponding to the contact points of the power supply base.

Further, a first line contact point is arranged at a center of a bottom surface of the power supply base, and a concentric annular second line contact point is arranged outside the first line contact point.

Further, the controller is provided with a wireless transmission module for receiving wireless control signals.

Further, the lamp pole is formed by connecting 2 or more support rods end to end; and

- the electrical interfaces are arranged on a support rod at a top end of the lamp pole and a support rod at a bottom end thereof.

Further, the support rods are provided with inserting slots, adjacent support rods are connected through inserting strips, and the inserting strips are located in the inserting slots and secured with screws.

According to the technical solution of the present disclosure, the design of the floor lamp allows the top light source assembly and the lamp strip to work simultaneously, which achieves both lighting and decorative effects and meets different usage needs in different scenarios. The top light source assembly and the lamp strip can be controlled separately, which means that the user can adjust the lighting intensity and decorative effects as needed, thus increasing the flexibility of use. The detachable design of the lamp strip allows the user to easily replace or maintain it, and the modular design also facilitates production and assembly.

Other features and advantages of the present disclosure will be set forth in the following specification, and will partially become apparent in the specification, or may be learned by implementing the present disclosure. The objective and other advantages of the present disclosure can be achieved and obtained by means of structures specially indicated in the written specification and accompanying drawings.

BRIEF DESCRIPTION OF THE DRAWINGS

The present disclosure will be described in detail below with reference to accompanying drawings to further clarify the above advantages of the present disclosure.

DETAILED DESCRIPTIONS OF THE EMBODIMENTS

Figure 1:
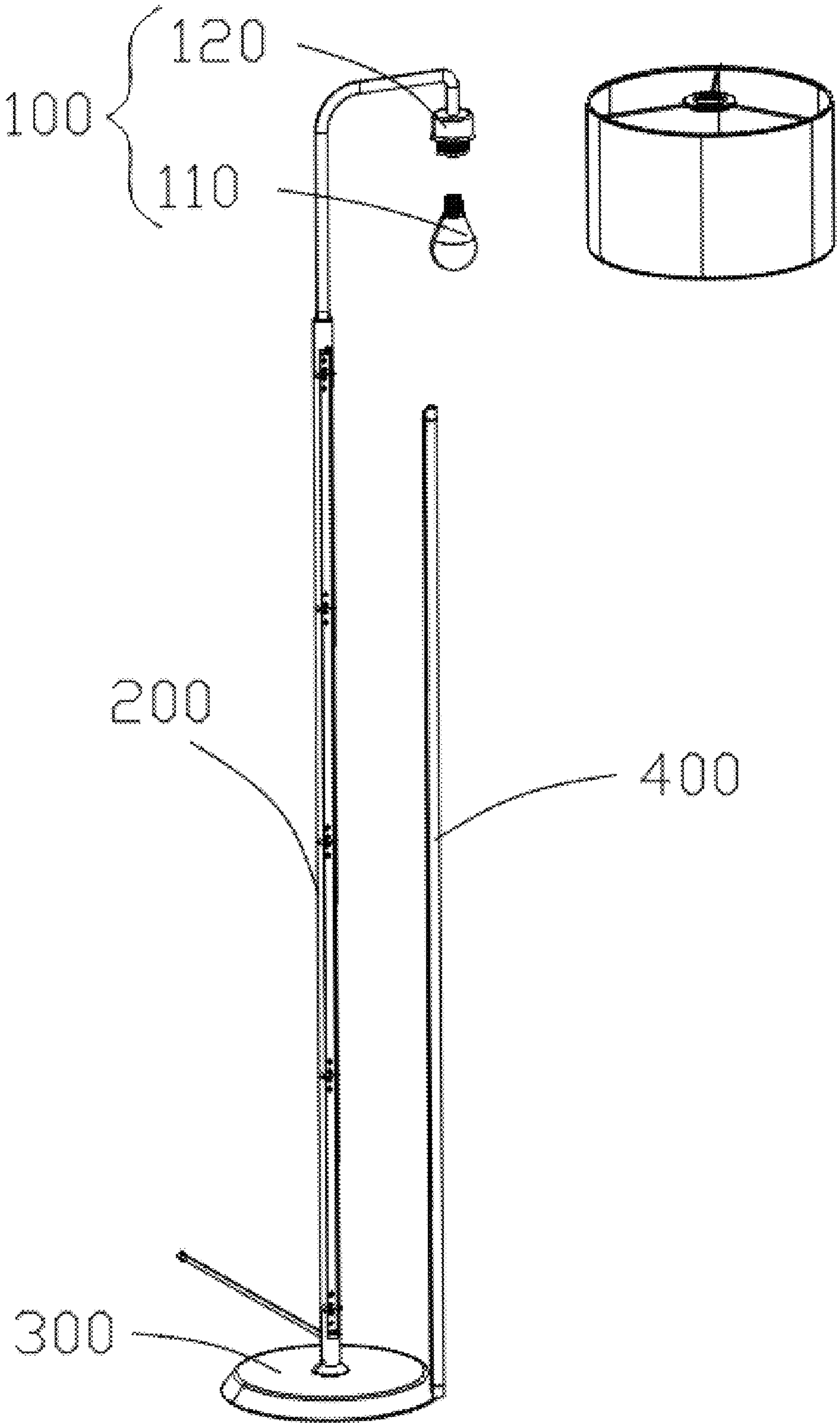
FIG. 1 is an exploded view of a floor lamp with a light-emitting lamp pole according to the present disclosure.
Figure 2:
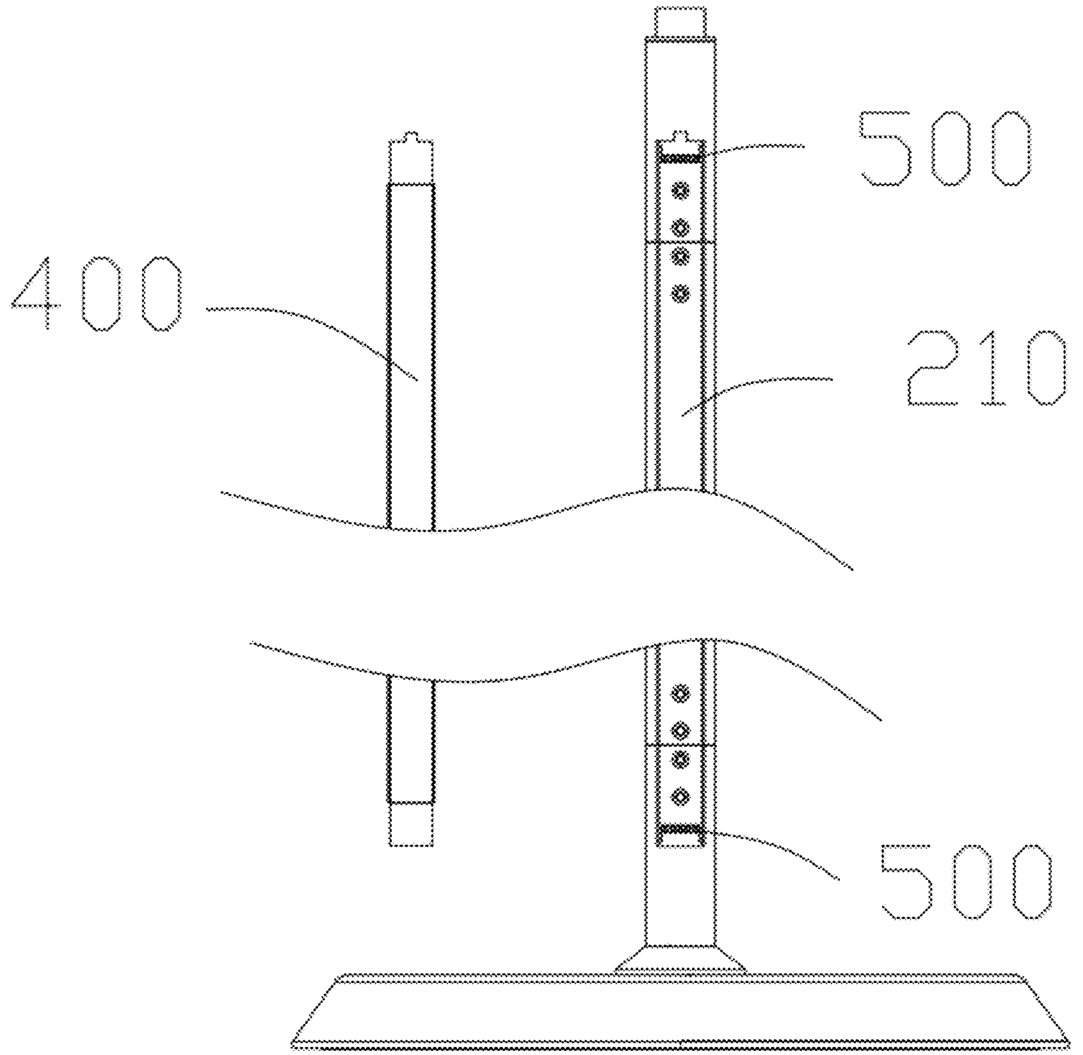
FIG. 2 is a schematic diagram of a lamp strip and a lamp pole of a floor lamp with a light-emitting lamp pole according to the present disclosure.

Embodiments of the present disclosure are described in detail below, and examples of the embodiments are shown in accompanying drawings, throughout which identical or similar reference numerals denote identical or similar elements or elements having identical or similar functions. The embodiments described with reference to the accompanying drawings are exemplary and only intended to explain the present disclosure, instead of being construed as limiting the present disclosure.

In the description of the present disclosure, it is to be understood that the terms "length", "width", "upper", "lower", "front", "back", "left", "right", "vertical", "horizontal", "top", "bottom", "inner", "outer", etc. indicate azimuthal or positional relations based on those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure.

Further, the terms "first" and "second" are merely for the purpose of description, and cannot be construed as indicating or implying relative importance or implicitly specifying the number of technical features indicated. Thus, a feature defined with "first" and "second" may explicitly or implicitly include one or more of the features. In the description of the present disclosure, "a plurality of" means two or more, unless expressly specified otherwise.

In the embodiments of the present disclosure, unless otherwise explicitly specified and defined, the terms "mounting", "connecting", "connection", "fixing", etc. should be understood Embodiment in a broad sense, for example, they may be a fixed connection, a detachable connection, or an integrated connection; may be a mechanical connection, or an electrical connection; may be a direct connection, or an indirect connection via an intermediate medium; and may be communication inside two elements, or an interactive relation between two elements. For those of ordinary skill in the art, the specific meanings of the above terms in the present disclosure may be understood according to specific circumstances.

With reference to FIGS. 1-10, a floor lamp with a light-emitting lamp pole includes:

- a top light source assembly 100;
- a lamp pole 200, where one end of the lamp pole 200 is connected to the top light source assembly 100, the other end of the lamp pole 200 is connected to a base 300, and a groove 210 is formed on a surface of the lamp pole 200;
- a lamp strip 400, where the lamp strip 400 is detachably mounted in the groove 210 of the lamp pole 200;
- a controller, where the controller is electrically connected to a power line and electrical interfaces 500 for power supply and control of the floor lamp; and
- an electrical interface 500 is arranged at both ends of the groove 210 respectively, the two electrical interfaces 500 are electrically connected to the controller and the top light source assembly 100 respectively, and when the lamp strip 400 is mounted in the groove 210 and connected to the electrical interfaces 500, a power supply circuit and a control circuit of the top light source assembly 100 and the lamp strip 400 are communicated with the controller.

The floor lamp not only meets lighting needs, but also achieves rich changes in colors and color temperatures through RGB lamp beads, thus enhancing the decorative effect. In a way of designing the groove 210 on the lamp pole 200, modular mounting of the lamp strip 400 is achieved, thus facilitating replacement and maintenance. The top light source assembly 100 and the lamp strip 400 use the RGB lamp beads, and are capable of independently controlling color temperatures and colors, such that a personalized lighting experience can be provided.

Connection functions of the lamp strip 400 and the electrical interfaces 500 are integrated to achieve dual functions of the lamp strip 400, i.e., the lamp strip 400 serves as both a light-emitting body and a circuit connection medium. The detachable design of the lamp strip 400 allows a user to replace or upgrade the lamp strip 400 as needed, and also provides the possibility of expanding the lamp. The controller integrates smart control functions, including a wireless connection function, through which the user can remotely control the lamp.

The controller is connected to the power line, to supply power required for the floor lamp. The lamp strip 400 is mounted in the groove 210 of the lamp pole 200, the electrical interfaces 500 at both ends of the groove 210 are connected to the controller and the top light source assembly 100, and the lamp strip 400 mounted, through an internal electrical conductor, is connected to the electrical interfaces 500. The controller transmits signals through the electrical interfaces 500, and the RGB lamp beads of the top light source assembly 100 and the lamp strip 400 are separately controlled to achieve independent adjustment of color temperatures and colors. In the process of mounting the lamp strip 400, its internal electrical conductor is connected to the electrical interfaces 500 at both ends of the groove 210, to ensure power supply and control signals of the top light source assembly 100 can be smoothly transmitted.

The lamp strip 400 not only achieves lighting and decorative effects, but also serves as a medium for circuit connections, thereby simplifying the design and reducing additional wiring requirements. The design of the lamp pole 200 and the lamp strip 400 make the lamp more visually attractive, enhancing the interior decoration effect. Circuit connectivity is achieved through the internal electrical conductor of the lamp strip 400, which reduces external wiring and improves system stability and reliability.

Figure 3:
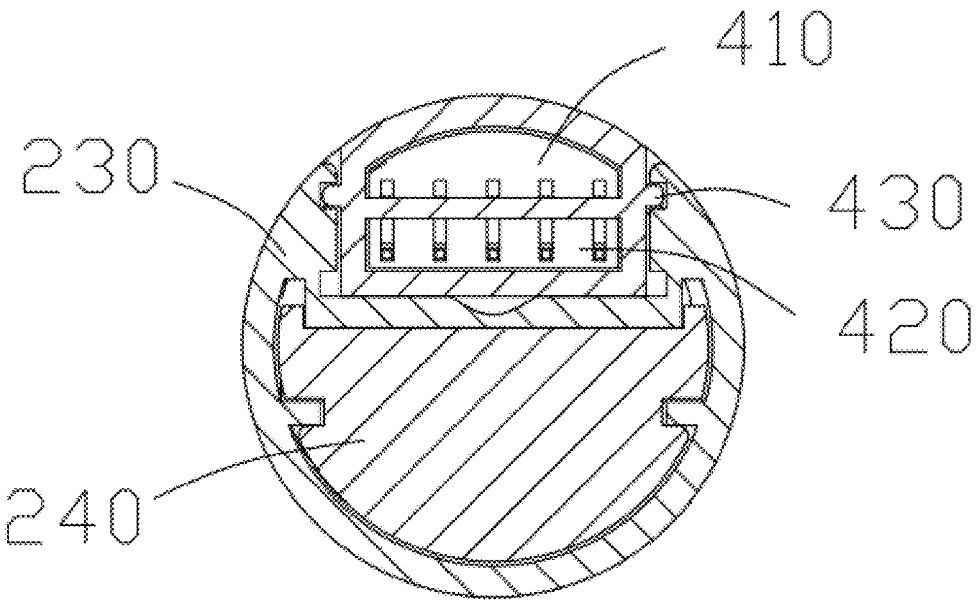
FIG. 3 is a sectional view of a lamp pole of a floor lamp with a light-emitting lamp pole according to the present disclosure.
Figure 4:
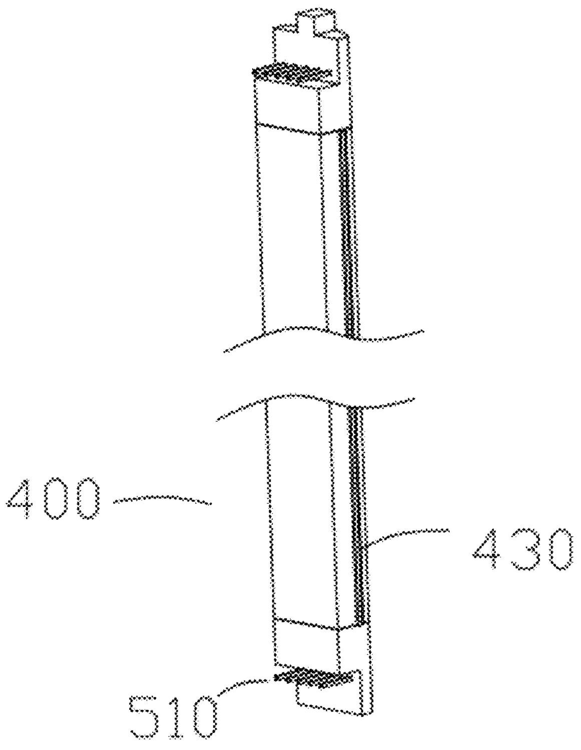
FIG. 4 is a schematic diagram of a lamp strip of a floor lamp with a light-emitting lamp pole according to the present disclosure.

With reference to FIGS. 3-4, in this embodiment, the lamp strip 400 is provided with a first cavity 410 and a second cavity 420;

- a light source of the lamp strip 400 is arranged in the first cavity 410, and a connector of the electrical conductor configured for communicating with both ends of the lamp strip 400 is arranged in the second cavity 420; and
- the first cavity 410 is located above the second cavity 420, and when the lamp strip 400 is mounted in the groove 210, the first cavity 410 faces outside of the groove 210.

The controller is connected to the power line through the electrical interfaces 500, to supply power for the floor lamp and receive control signals. The lamp strip 400 is mounted in the groove 210 of the lamp pole 200 in a detachable manner, and it is needed to ensure that the first cavity 410 faces outward, to achieve the lighting function. The electrical conductor in the second cavity 420 is connected to the electrical interfaces 500 at both ends of the groove 210, to achieve the transmission of power supply and control signals to the lamp strip 400 and the top light source assembly 100. The controller independently controls the RGB lamp beads of the top light source assembly 100 and the lamp strip 400 in accordance with user settings, to achieve adjustment of color temperatures and colors.

The lamp strip 400 is divided into two cavities to place the light source and the electrical conductor separately, which optimizes use of an internal space of the lamp strip 400, and improves the design efficiency. A translucent housing design of the first cavity 410 not only makes its appearance more attractive, but also enhances the lighting effect. The electrical conductor is designed in the second cavity 420 to arrange the power supply lines and the control lines, which ensures independent control and power supply for the lamp strip 400 and the top light source assembly 100. The lamp strip 400 mounted is flush with the lamp pole 200, thereby providing a trim appearance and a seamless lighting experience.

In this embodiment, sealing strips 430 are arranged on both sides of the lamp strip 400 in an extending direction of the lamp strip 400, and sealing grooves corresponding to the sealing strips 430 are formed on a side wall of the groove 210. The combined use of the sealing strips 430 and the sealing grooves is designed, which achieves fixation of the lamp strip 400 and a certain sealing effect, and ensures the stability and durability of the lamp. The combination of the sealing strips 430 with the sealing grooves simplifies the installation process of the lamp strip 400, such that the user can easily secure the lamp strip 400 on the lamp pole 200. The sealing design helps to improve dustproof and waterproof properties of the lamp, protect the light source and the electrical conductor, and prolong the service life of the lamp.

When the user pushes the lamp strip 400 in a direction of the groove 210 of the lamp pole 200, the sealing strips 430 on both sides of the lamp strip 400 correspondingly cooperate with the sealing grooves on the side wall of the groove 210. The sealing strips 430 are clamped into the sealing grooves to secure the lamp strip 400, and a tight connection between the sealing strips 430 and the sealing grooves achieves a sealing effect. After the lamp strip 400 is mounted in place, its internal electrical conductor is connected to the electrical interfaces 500 at both ends of the groove 210, to complete connections of the power supply lines and the control lines.

In this embodiment, the electrical interfaces 500 include 5 line contact points, and the 5 line contact points are respectively used for independent power supply and control of the top light source and the lamp strip 400. The 5 line contact points include a negative power supply line, a positive power supply line for the top light source, a control line for the top light source, a positive power supply line for the lamp strip 400, and a control line for the lamp strip 400.

The controller is connected to the power line, to supply power to the floor lamp. The negative power supply line in the 5 line contact points serves as a common terminal, and forms a loop together with the positive power supply lines for the top light source and the lamp strip 400 respectively to achieve independent power supply. Contact points of the control lines for the top light source and the lamp strip 400 are connected to the controller respectively, to achieve the transmission of independent control signals. Based on the user's instructions, the controller transmits control signals through the contact points of the control lines, and adjusts the brightness, color temperatures and colors of the top light source and the lamp strip 400. After the lamp strip 400 is mounted in the groove 210, interfaces at both ends of the lamp strip 400 are connected to the electrical interfaces 500 of the groove 210, to complete connections of the power supply lines and the control lines.

Each light source assembly has independent power supply and control lines, which can be adjusted separately to provide more personalized lighting solutions. The design allows the user to adjust the lighting effect according to needs, and the brightness, color temperatures or colors can be independently controlled.

In this embodiment, the electrical interfaces 500 are pin slots, and the interfaces at both ends of the lamp strip 400 are pins 510. The user align the pins of the lamp strip 400 with the pin slots in the groove 210 for initial positioning. The pins are inserted into the pin slots to achieve an electrical connection and ensure power supply and control signal transmission of the lamp strip 400. After positioning, the user pushes other parts of the lamp strip 400 into the groove 210 to complete the installation. After the lamp strip 400 is pushed into the groove 210, fixation and sealing can be achieved through the cooperation of the sealing strips 430 with the sealing grooves. The combination of the pins and the pin slots can play a role of electrical connection and facilitate the positioning and installation of the lamp strip 400.

Figure 5:
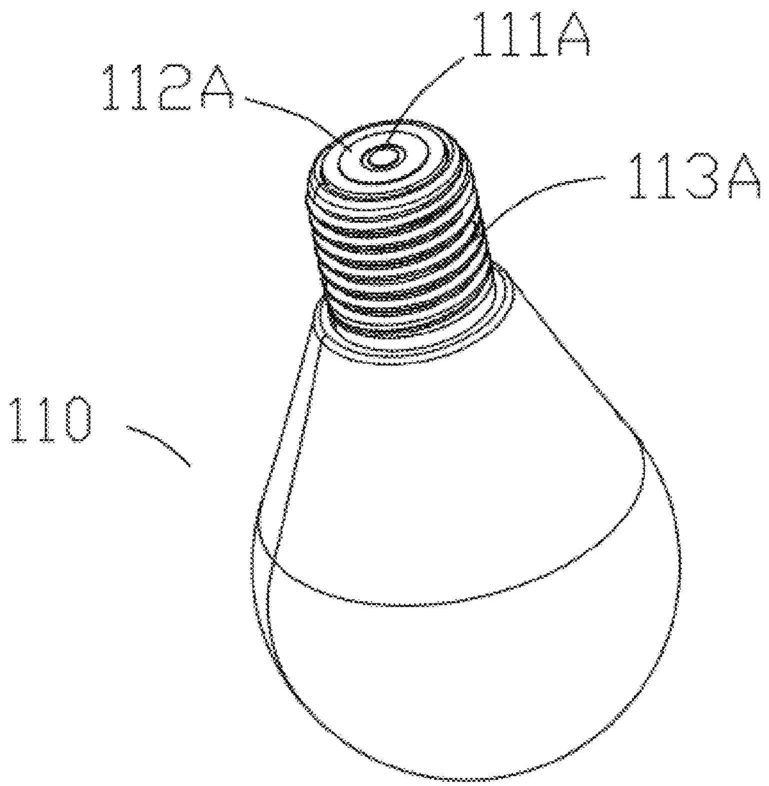
FIG. 5 is a schematic diagram of a light source of a floor lamp with a light-emitting lamp pole according to the present disclosure.
Figure 6:
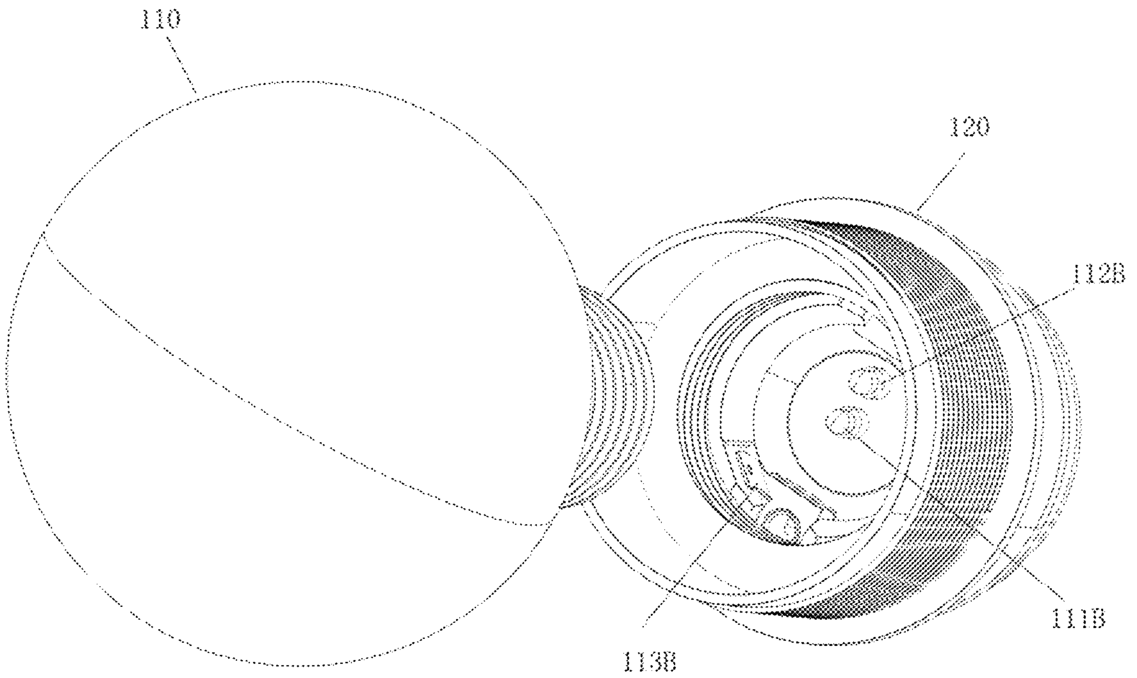
FIG. 6 is a schematic diagram of inside of a lamp holder of a floor lamp with a light-emitting lamp pole according to the present disclosure.

With reference to FIGS. 5-6, in this embodiment, a power supply base of a light source 110 of the top light source assembly 100 is provided with 3 line contact points corresponding to a power supply loop and a control circuit of the light source 110.

A lamp holder 120 of the top light source assembly 100 is provided with metal parts corresponding to the contact points of the power supply base.

In the prior art, only power supply interfaces are available for the lamp holder 120 of the light source and the power supply base of the light source. A light source of wireless control in the prior art usually is provided with a built-in wireless control module for receiving control signals. When this scheme is adopted in the technical solution, the lamp strip 400 further requires a separate wireless control module.

Line contact points are added between the light source 110 and the lamp holder 120 to achieve direct transmission of control signals, thus avoiding the dependence on the built-in wireless control module in the light source. The need for the built-in wireless control module in the light source is eliminated, which simplifies the internal design of the light source and reduces costs and complexity. The unified controller is used to control both the top light source assembly 100 and the lamp strip 400, which improves system integration and operational convenience.

The controller supplies power to the floor lamp through the power line and transmits control signals through the electrical interfaces 500. The 3 line contact points on the power supply base are connected to the corresponding metal parts of the lamp holder 120, to achieve connections of power supply loops and control circuits. The controller transmits control signals through the electrical interfaces 500 to the light source 110 and the lamp strip 400, and transmits to the light source 110 through the line contact points. The light source of the top light source assembly 100 and the lamp strip 400 can be controlled independently based on the user's needs or can work together to achieve different lighting effects.

In this embodiment, a first line contact point 111A is arranged at a center of a bottom surface of the power supply base, and a concentric annular second line contact point 112A is arranged outside the first line contact point 111A. It is considered that the light source 110 is screwed into the lamp holder 120 in the mounting process. The first line contact point at the center and the annular second line contact point are adapted to an installation method for lamp bulbs, and a third line contact point 113A is located on a side surface of the power supply base. Compared to conventional light sources, an annular second line contact point is added on the bottom surface of the power supply base for transmitting control signals. Only part of a bottom end of the lamp holder 120 is modified. The lamp holder is provided with a first metal part 111B, a second metal part 112B and a third metal part 113B correspondingly.

In design, compatibility with the lamp holder 120 in the prior art is considered. The annular second line contact point is added, and the annular second line contact point is specifically used for transmitting control signals, which enriches the functions of the light source, such as light regulation, color adjustment, and the like. The installation method of screwing the light source is maintained, and the user does not need to change his/her installation habits. Further, the installation process is simplified. Improvements are made only to the bottom end of the lamp holder 120, thereby reducing overall costs and making the upgrade more cost-effective.

In this embodiment, the controller is provided with a wireless transmission module for receiving wireless control signals. By integrating the wireless transmission module, the controller is capable of receiving control signals from different sources, including a remote controller, WIFI, Bluetooth, and the like. A variety of control options are available to users. Different users may prefer different control modes, and diverse control options can meet a wider range of user needs, thereby improving the user experience. By integrating modern wireless communication technology into the controller, seamless integration with smart home systems is achieved.

The wireless transmission module of the controller receives control signals from devices such as the remote controller, WIFI or Bluetooth. The controller decodes received signals, and identifies the user's control instructions. Based on the decoded instructions, the controller transmits corresponding control signals through the electrical interfaces 500 to the top light source assembly 100 and the lamp strip 400 of the floor lamp, to achieve adjustments in the brightness, color temperatures, colors and the like. Compatibility with the WIFI and Bluetooth for control causes the floor lamp to be easily integrated into smart home systems, so as to achieve remote control and automated operations.

Figure 7:
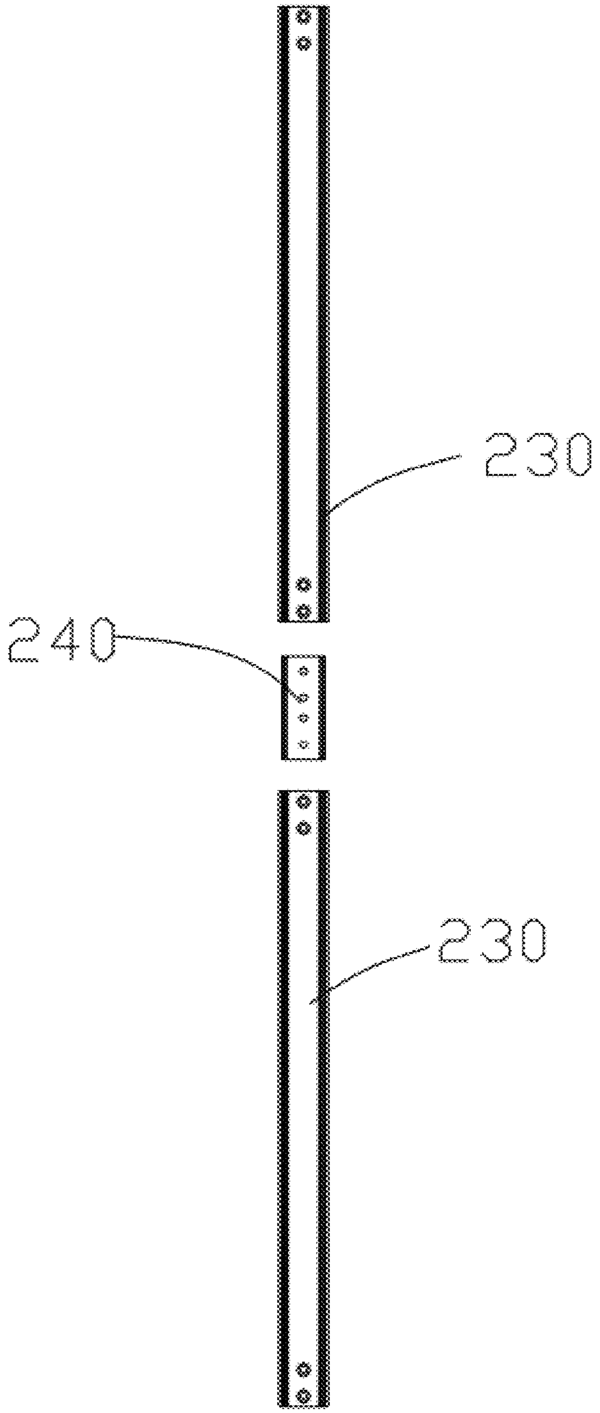
FIG. 7 is a partial exploded view of a lamp pole of a floor lamp with a light-emitting lamp pole according to the present disclosure.
Figure 8:
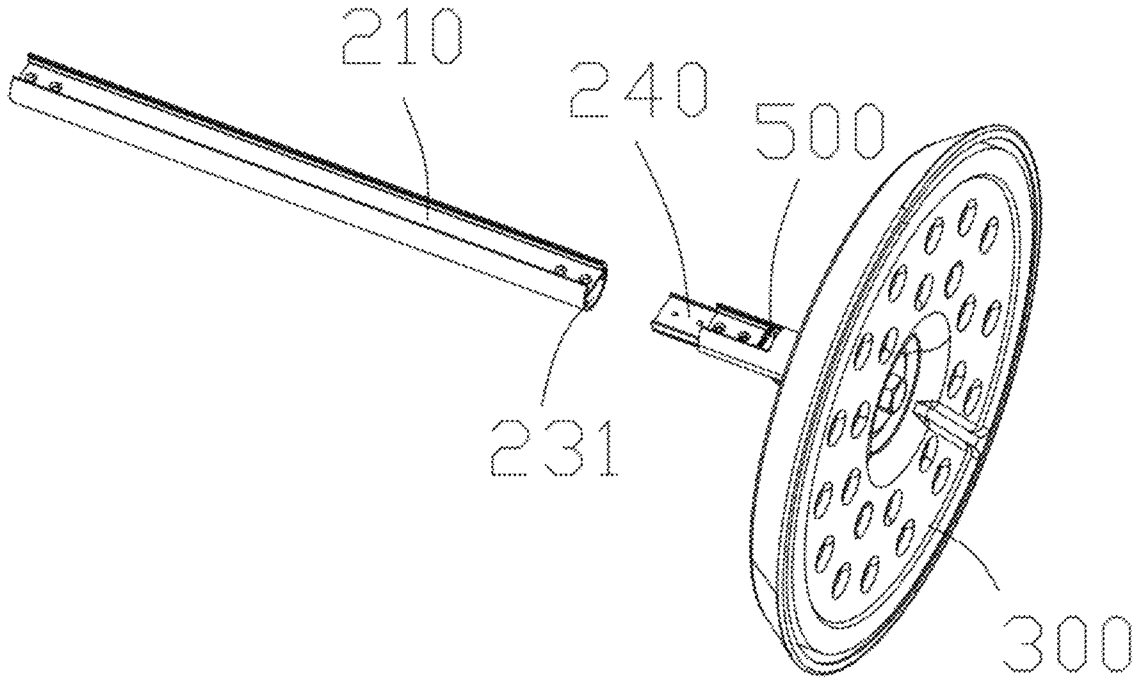
FIG. 8 is a partial schematic diagram of a floor lamp with a light-emitting lamp pole according to the present disclosure.
Figure 9:
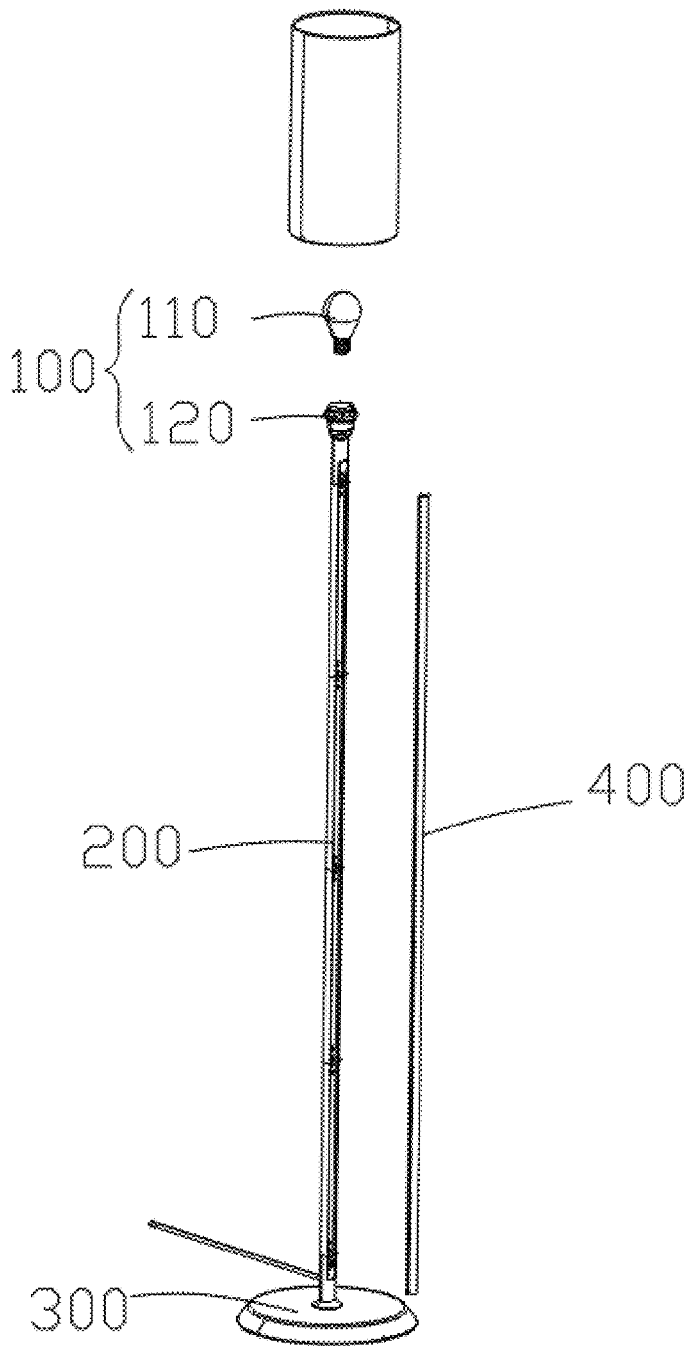
FIG. 9 is a schematic diagram of a floor lamp with a light-emitting lamp pole in Embodiment 2 of the present disclosure.

With reference to FIGS. 7-8, in this embodiment, the lamp pole 200 is formed by connecting 2 or more support rods 230 end to end.

The electrical interfaces 500 are arranged on a support rod at a top end of the lamp pole 200 and a support rod at a bottom end thereof.

A plurality of support rods 230 of the lamp pole 200 can be individually packaged, to reduce transportation volume and costs. In accordance with the installation instructions, the user can assemble all the support rods 230 to form the complete lamp pole 200. The electrical interfaces 500 are arranged on the support rod at the top end and the support rod at the bottom end, which are configured for connecting with the top light source assembly 100 and the lamp strip 400. The lamp strip 400 is provided with an integrated signal transmission unit. After being assembled, the lamp pole 200 is connected to the controller through the electrical interfaces 500, to achieve power supply and control.

The lamp pole 200 is split into a plurality of parts, and a size of individual packaging is reduced, thereby effectively reducing transportation costs. The circuit transmission is integrated in the lamp strip 400, which eliminates the need for wiring in a middle of the lamp pole 200, and reduces assembly complexity. Due to no need of wiring in the middle of the lamp pole 200, both the assembly complexity and potential failures are reduced.

In this embodiment, the support rods 230 are provided with inserting slots 231, adjacent support rods 230 are connected through inserting strips 240, and the inserting strips 240 are located in the inserting slots 231 and secured with screws. The design of the inserting strips 240 and the inserting slots 231, and securing by screws, provide a more stable connection mode than a threaded screw connection. Compared to the threaded screw connection, the design of the inserting strips 240 and the inserting slots 231 simplifies the assembly process, and the user can quickly connect the support rods 230. The inserting slots 231 help to align the inserting strips 240 accurately, thereby ensuring the straightness of the lamp pole 200 and the stability of the overall structure.

The user aligns one of the inserting strips 240 with one of the inserting slots 231, then a screw penetrates through a hole in the inserting strip 240, and screwing into a threaded hole in the inserting slot 231 is performed to complete securing. After the screw is tightened, the inserting strip 240 and the inserting slot 231 are tightly connected, to form a stable structural connection. In the connection process, the user can ensure alignment of the groove 210, to facilitate the installation of the lamp strip 400 and the connection of the circuits. According to the screw fixation method, screws can be hidden inside the lamp, without affecting the appearance of the lamp.

Figure 10:
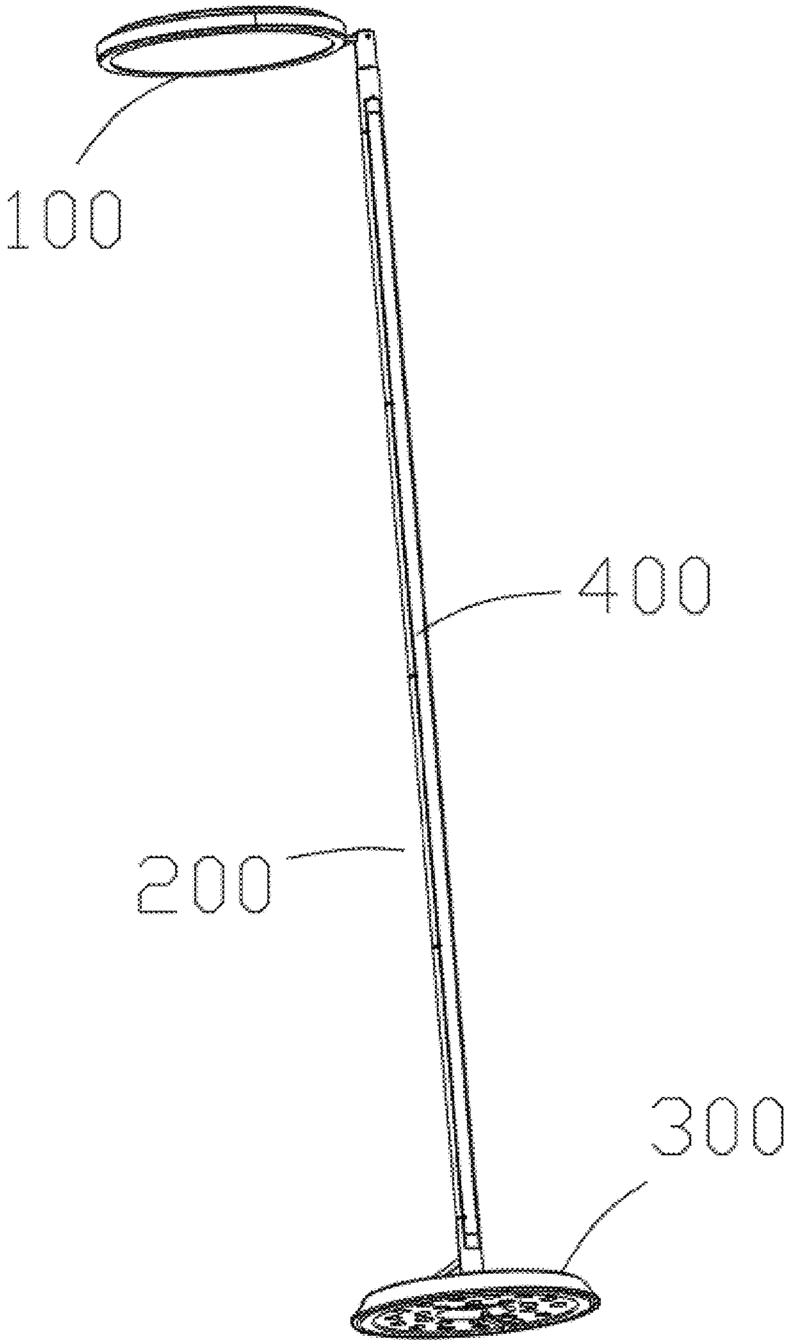
FIG. 10 is a schematic diagram of a floor lamp with a light-emitting lamp pole in Embodiment 3 of the present disclosure.

With reference to FIG. 10, the light source of the top light source assembly 100 is a LED lamp, and the LED lamp beads are directly connected to the electrical interface 500 at a top end of the lamp pole 200.

Finally, it should be noted that the above is only a preferred embodiment of the present disclosure, and is not intended to limit the present disclosure. Although the present disclosure has been described in detail with reference to the above embodiment, for those skilled in the art, it is still apparent that the technical solutions described in the above embodiment may be modified, or some technical features thereof may be equivalently replaced. Any modifications, equivalent substitutions, improvements, etc. within the spirit and principles of the present disclosure are intended to fall within the scope of protection of the present disclosure.

What is claimed is:

1. A floor lamp with a light-emitting lamp pole, comprising:

a top light source assembly;

a lamp pole, wherein one end of the lamp pole is connected to the top light source assembly, the other end of the lamp pole is connected to a base, and a groove is formed on a surface of the lamp pole;

a lamp strip, wherein the lamp strip is detachably mounted in the groove of the lamp pole;

a controller, wherein the controller is electrically connected to a power line and electrical interfaces for power supply and control of the floor lamp; and the electrical interfaces are arranged at both ends of the groove respectively, the electrical interfaces are electrically connected to the controller and the top light source assembly respectively, and when the lamp strip is mounted in the groove and connected to the electrical interfaces, a power supply circuit and a control circuit of the top light source assembly and the lamp strip are communicated with the controller;

wherein the lamp strip is provided with a first cavity and a second cavity;

a light source of the lamp strip is arranged in the first cavity, and a connector of the electrical conductor configured for communicating with both ends of the lamp strip is arranged in the second cavity; and the first cavity is located above the second cavity, and when the lamp strip is mounted in the groove, the first cavity faces outside of the groove.

2. The floor lamp according to claim 1, wherein sealing strips are arranged on both sides of the lamp strip in an extending direction of the lamp strip, and sealing grooves corresponding to the sealing strips are formed on a side wall of the groove.

3. The floor lamp according to claim 1, wherein the electrical interfaces include 5 line contact points, and the 5 line contact points are respectively used for independent power supply and control of the top light source and the lamp strip.

4. The floor lamp according to claim 1, wherein the electrical interfaces are pin slots, and interfaces at both ends of the lamp strip are pins.

5. The floor lamp according to claim 1, wherein a power supply base of a light source of the top light source assembly is provided with 3 line contact points corresponding to a power supply loop and a control circuit of the light source; and a lamp holder of the top light source assembly is provided with metal parts corresponding to the 3 line contact points of the power supply base.

6. The floor lamp according to claim 5, wherein a first line contact point is arranged at a center of a bottom surface of the power supply base, and a concentric annular second line contact point is arranged outside the first line contact point.

7. The floor lamp according to claim 1, wherein the controller is provided with a wireless transmission module for receiving wireless control signals.

8. The floor lamp according to claim 1, wherein the lamp pole is formed by connecting 2 or more support rods end to end; and the electrical interfaces are arranged on a support rod at a top end of the lamp pole and a support rod at a bottom end thereof.

9. The floor lamp according to claim 8, wherein the support rods are provided with inserting slots, adjacent support rods are connected through inserting strips, and the inserting strips are located in the inserting slots and secured with screws.

* * * * *